Jan. 18, 1955  E. J. KORECKY  2,699,600
APPARATUS FOR MAKING SHACKLE BOLTS
Filed Sept. 30, 1948  3 Sheets-Sheet 1
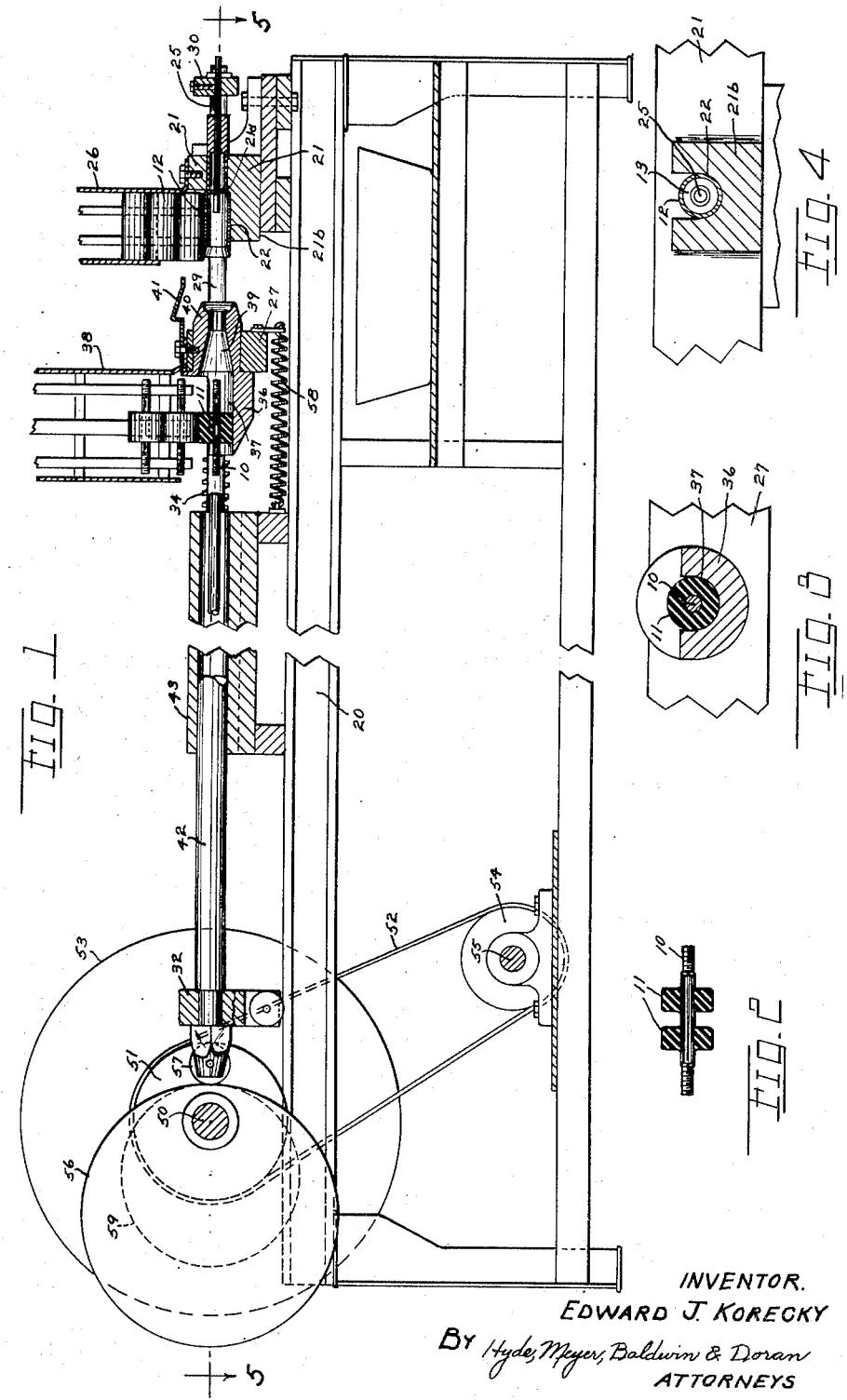
INVENTOR.
EDWARD J. KORECKY
BY Hyde, Meyer, Baldwin & Doran
ATTORNEYS

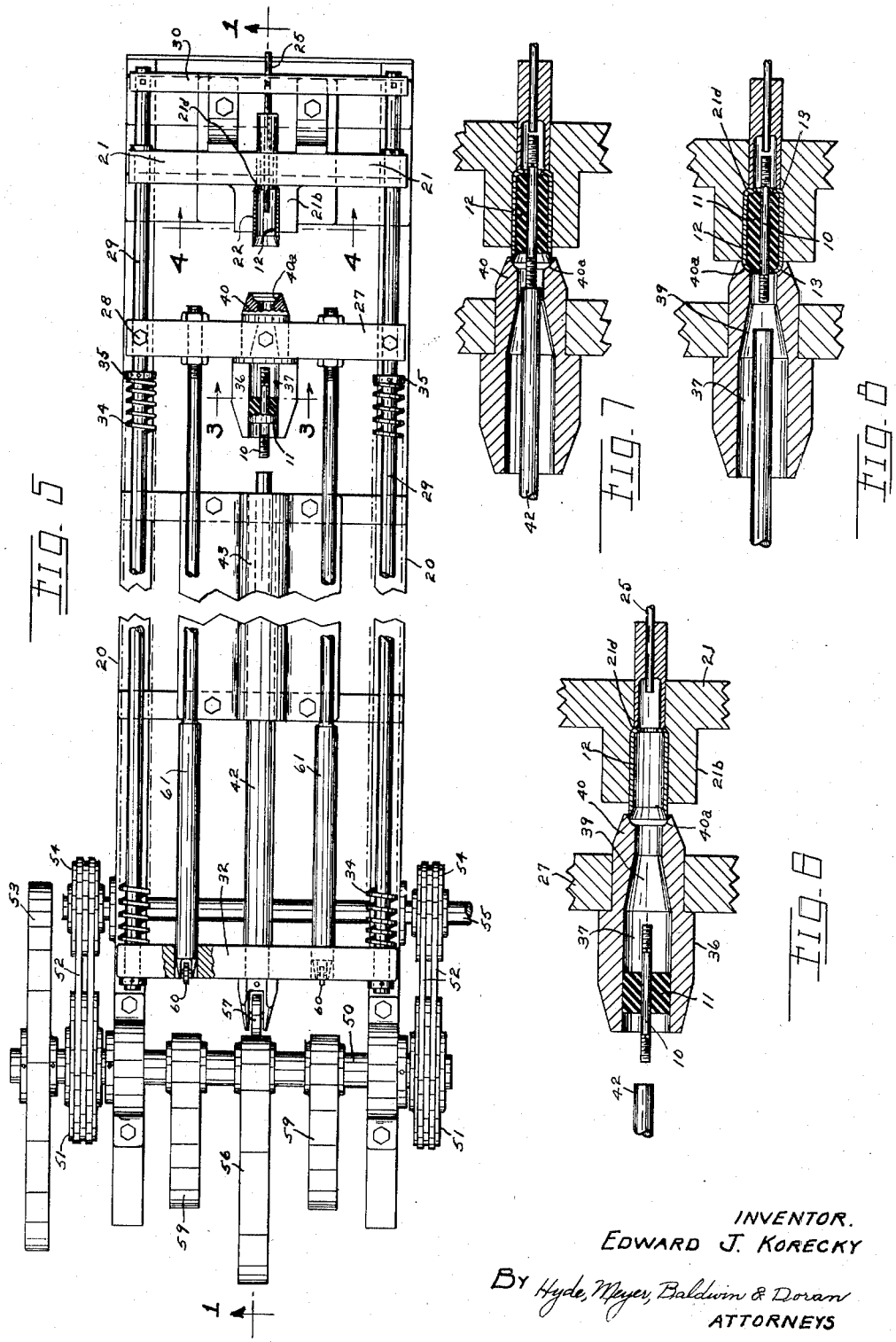

Jan. 18, 1955  E. J. KORECKY  2,699,600
APPARATUS FOR MAKING SHACKLE BOLTS
Filed Sept. 30, 1948  3 Sheets-Sheet 3
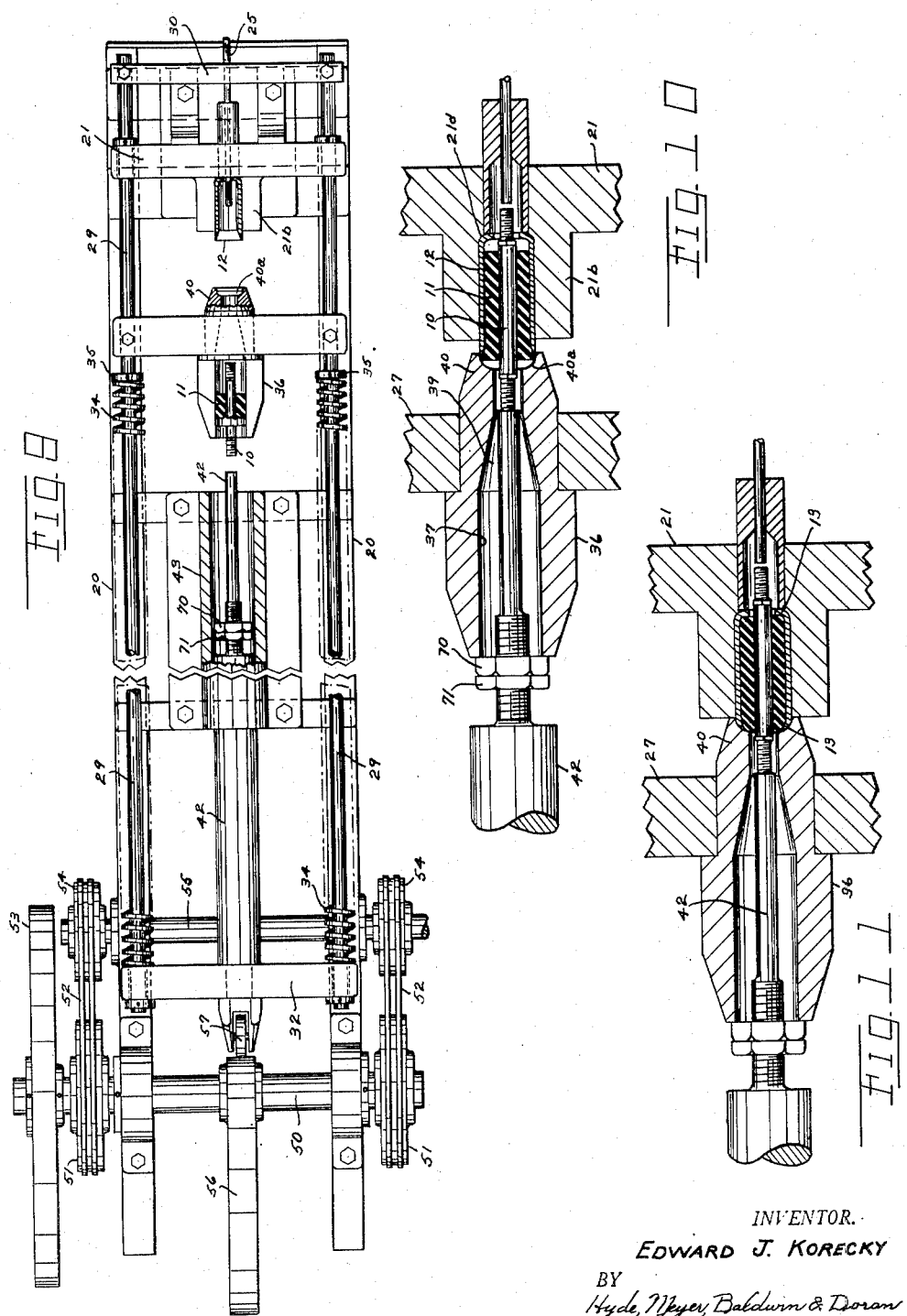
INVENTOR.
EDWARD J. KORECKY
BY
Hyde, Meyer, Baldwin & Doran
ATTORNEYS

# United States Patent Office 2,699,600
Patented Jan. 18, 1955

2,699,600

APPARATUS FOR MAKING SHACKLE BOLTS

Edward J. Korecky, Shaker Heights, Ohio, assignor to Barmatic Machines, Inc., Cleveland, Ohio, a corporation of Ohio.

Application September 30, 1948, Serial No. 51,917

6 Claims. (Cl. 29—235)

This invention relates to apparatus for making shackle bolts, and more particularly that type in which the bolt, usually threaded at both ends, is mounted in a resilient rubber sleeve housed within an outer enclosing cylindrical metal sheath. The invention is an improvement upon that shown, described and claimed in my prior application for Apparatus for Making Shackle Bolts, Serial Number 684,376, filed July 17, 1946, now Patent No. 2,492,227 of December 27, 1949, to which reference may be had if desirable or necessary.

In the machine of said prior application, the bolt carrying its rubber sleeve is forced endwise through a tapered forming channel to reduce and elongate the rubber sleeve and then into the enclosing sheath, the far end of which is usually already flanged inwardly to close or seal the rubber space.

One object of the present invention is to improve the prior machine by the addition thereto of means adapted and arranged to flange inwardly the near end of the sheath, so that in the final product the rubber space is closed or sealed at both ends, instead of at one only, as heretofore.

A further object is to provide improved means for flanging inwardly the near end of the enclosing sheath by an operation performed in the same machine and during the same operations heretofore performed.

Still another object is to so modify the forming block and so operate it as not only to perform all of the tasks assigned to it in the prior machine, but also the further task of closing one end of the sheath after insertion of the rubber sleeve therein.

Further objects of the invention in part are obvious and in part will appear more in detail hereinafter.

In the drawings, Fig. 1 represents a longitudinal sectional elevation on the line 1—1, Fig. 5, through one form of machine embodying the invention;

Fig. 2 is a detail sectional view, showing a second form of pre-assembled bolt and rubber sleeve unit, ready for insertion into a sheath;

Fig. 3 is a detail cross section, on a larger scale, on the line 3—3, Fig. 5;

Fig. 4 is a similar section on the line 4—4, Fig. 5;

Fig. 5 is a plan view, partly in section on the line 5—5, Fig. 1;

Fig. 6 is a detail sectional plan view through the forming and assembling parts;

Figs. 7 and 8 are similar views, illustrating other positions of the parts;

Fig. 9 is a view generally similar to Fig. 5, but showing another embodiment of the invention; and Figs. 10 and 11 are views corresponding to Figs. 7 and 8, but showing the same machine as Fig. 9.

As in my prior application, the shackle bolt may take any of several forms. In Fig. 8 the finished bolt includes the bolt member 10, usually threaded at both ends, the single rubber sleeve 11, and an enclosing metal sheath 12, flanged inwardly at both ends, as at 13, to more or less close or seal the rubber space. In Fig. 2 the rubber sleeve is divided into two parts spaced apart along the bolt. The present machine has fed to it one series of pre-assembled bolt and rubber sleeve units, and a second series of metal sheaths, flanged inwardly at one end only, for assembly by endwise telescoping motion, as before.

The machine shown in Figs. 1 to 8 inclusive is much like that of my prior application and for the most part requires but brief description.

It includes a sturdy frame 20, a stationary cross bar 21 which supports a block 21b provided with a semi-cylindrical recess or seat 22 for the metal sheath fed to it from magazine 26.

At one end of said recess or seat an ejector pin 25 is carried by cross bar 30. At the other end of said recess, and axially alined with it, is a forming block 36 having a semi-cylindrical seat 37 for the pre-assembled bolt and rubber sleeve units fed to it from magazine 38. Block 36 also has a tapered forming channel 39 and terminates in a nose 40 presented toward the unflanged end of the sheath to be assembled.

Block 36 is supported on cross bar 27 attached to parallel longitudinal rods 29, which also carry the cross bar 30 before referred to. Thus, bars 27, 30 and rods 29, secured together as they are, form or provide a rigid carriage capable of back and forth movement as a unit upon the stationary frame.

Rods 29 slide in openings in the stationary cross bar 21 and also in openings in a cross head 32 rigidly attached to plunger 42, the latter being provided at one end with roller 57 and having its opposite operating end reduced and lying axially alined with the end of the bolt to be assembled. Between its ends plunger 42 slides in a fixed guide sleeve 43. Strong compression springs 34 are mounted upon rods 29 between collars 35 thereon and the cross head 32, their purpose being to always bias the carriage one way and the plunger the other way, but permitting relative movement between them when necessary. Tension springs 58 serve to retract the carriage after it is advanced.

Plunger 42 is advanced by engagement with its roller 57 of a cam 56 upon a shaft 50 provided with belt pulley 51 connected by belts 52 to a pulley 54 on suitable driven power shaft 55.

Assuming that a sheath, flanged inwardly at one end only (its far end), is lying on its seat, and that a pre-assembled bolt and rubber sleeve unit lies upon its seat, with the parts in the positions shown in Figs. 1 and 5, as shaft 50 rotates, cam 56 pushes over roller 57 and advances plunger 42 to the right, increasing the tension in the retracting springs 58, which always tend to hold roller 57 against the cam. Through springs 34 the carriage is also advanced until the nose 40 of the forming block engages the unflanged near end of the sheath. Thereupon the carriage stops, but the plunger continues its advance motion, pushing the bolt ahead of it and reducing and driving its rubber sleeve through the tapered forming channel 39 to reduce and elongate the rubber, and then pushing the bolt and sleeve into the sheath to the position shown in Fig. 7.

In the present machine I provide means, operative or effective at this particular moment in the cycle of operations, for suddenly imparting to the forming block a positive strong punch or push, compelling it to advance with sufficient force to flange inwardly the unflanged end of the sheath against which it abuts. For this purpose the nose 40 of the forming block 36, at its advance end, is provided with an internal annular forming groove or channel 40a, shown in Figs. 7 and 8. The punch or push is caused by two rods 61 adjustably attached at their forward ends to the cross head 27 which carries the forming block, and at their rear ends extending through guide openings in the cross head 32, beyond which they are provided with rollers 60. These rollers are located for engagement, at the proper time, by cams 59 carried by the same shaft 50 which carries cam 56, the two sets of cams 56, 59 being properly timed on the shaft, as will be readily understood.

Accordingly, with this machine, at the moment when insertion of the bolt and sleeve unit into the sheath is being completed, the forming block is advanced under powerful pressure a short distance, just enough to flange the rear end of the sheath inwardly and close the rubber space. An abutment shoulder 21d on block 21 at the far end of the sheath seat, absorbs the thrust of the blow.

Plunger movement of course has stopped, and all parts return to their original positions, the finished article being ejected by pin 25, as before.

Figs. 9, 10 and 11 show a simpler, and from that standpoint preferably, arrangement for the same purpose. Here the rods 61, roller 60 and cams 59 of Fig. 1 are omitted. Instead, plunger 42 is provided, on the reduced forward position of its shank, with a solid shoulder or abutment, such as the forward face of nut 70, adjustable fore-and-aft along the plunger and held securely in any position thereon by lock nut 71. This nut is adjusted to such position upon the plunger that when the latter has pushed the bolt and sleeve home in the sheath, or just a little ahead of that point, the nut engages the near end of the forming block 36 and transmits directly to it the full thrust of the cam 56. The effect is to advance the nose of the forming block and thus flange inwardly the near end of the sheath, just as before.

In both forms, after the pre-assembled bolt and rubber sleeve unit has been fed to its seat on block 36, the block is advanced until it engages the sheath; then the bolt and sleeve are pushed into the sheath; and finally the block is again advanced to flange the sheath. Forward movement of all parts is compelled by the same shaft 50, with timed relation between all movements.

Other arrangements for the same purpose will be apparent to those skilled in the art.

What I claim is:

1. Apparatus for making shackle bolts, comprising a frame, a stationary support mounted thereon and provided with a holding seat for supporting a tubular sheath with its central axis horizontally disposed, a carriage movably mounted upon the frame for reciprocation along lines parallel to said axis, a forming block mounted upon the carriage and having a forming channel tapering toward the sheath seat and at the large end of said channel having a carrying seat for supporting a rod and a rubber sleeve member in axial alinement with the channel and sheath, said block at its forward end being provided with an internal annular forming groove surrounding the channel therethrough, a plunger slidably mounted upon the frame with its operating end portion presented toward the carrying seat for movement along said axis to and through said forming channel, resilient means operatively connecting the plunger and carriage and normally biasing them apart, means for advancing the plunger and the block with a rod and rubber sleeve member carried by the block until the block engages the near end of the sheath and for advancing the plunger independently of the block so as to push the rod and rubber sleeve member through the tapered forming channel to thereby reduce and elongate the rubber sleeve member and at the same time telescopically inserts the rod and rubber sleeve member into the sheath, and means operative after insertion of the rod and rubber sleeve member into the sheath for positively advancing the forming block and thereby causing its said annular forming groove to inwardly flange the near end of the sheath to close the rubber space therein.

2. An apparatus, as set forth in claim 1, wherein a lost motion means operatively connects the plunger and carriage, and wherein said resilient means normally bias the plunger and carriage apart to their maximum separated position.

3. An apparatus, as set forth in claim 1, wherein said means for advancing the plunger and said means for positively advancing the forming block to inwardly flange the sheath include a common operating shaft.

4. An apparatus, as set forth in claim 1, wherein said plunger advancing means includes an operating shaft, and wherein said means for positively advancing the forming block to inwardly flange the sheath includes a cam on said shaft arranged to directly engage said carriage and positively advance the forming block.

5. Apparatus for making shackle bolts, comprising a frame, a stationary support mounted thereon and provided with a holding seat for supporting a tubular sheath with its central axis horizontally disposed, a carriage movably mounted upon the frame for reciprocation along lines parallel to said axis, a forming block mounted upon the carriage and having a forming channel tapering toward the sheath seat and at the large end of said channel having a carrying seat for supporting a rod and a rubber sleeve member in axial alinement with the channel and sheath, said block at its forward end being provided with an internal annular forming groove surrounding the channel therethrough, a plunger slidably mounted upon the frame with its operating forward end portion presented toward the carrying seat for movement along said axis to and through said forming channel, resilient means operatively connecting the plunger and carriage and normally biasing them apart, means for advancing the plunger so that the block and a rod and rubber sleeve member carried by the block are advanced until the block engages the near end of the sheath whereupon block advance ceases and the plunger continues to advance and pushes the rod and rubber sleeve member through the tapered forming channel to thereby reduce and elongate the rubber sleeve member and at the same time telescopically inserts the rod and rubber sleeve member into the sheath, and an abutment member mounted on the plunger and so located that as the inserting operation is completed said abutment member engages the forming block and positively advances the same to cause its said annular forming groove to inwardly flange the near end of the sheath to close the rubber space therein.

6. An apparatus, as set forth in claim 5, wherein said abutment member includes a nut threaded onto said plunger for adjusting the contact position with said forming block.

References Cited in the file of this patent

UNITED STATES PATENTS

| | | |
|---|---|---|
| 1,971,117 | Mossberg | Aug. 21, 1934 |
| 2,127,982 | Northup et al. | Aug. 23, 1938 |
| 2,145,125 | Moore | Jan. 24, 1939 |
| 2,152,813 | Moore | Apr. 4, 1939 |
| 2,208,584 | Jeffords et al. | July 23, 1940 |
| 2,492,227 | Korecky | Dec. 27, 1949 |